(12) United States Patent  
Combes

(10) Patent No.: US 6,292,987 B1  
(45) Date of Patent: Sep. 25, 2001

(54) TIE DOWN DEVICE AND METHOD OF USE

(76) Inventor: Brian H. Combes, 8992 W. Temple Pl., Littleton, CO (US) 80123

( * ) Notice: Subject to any disclaimer, the term of this patent is extended or adjusted under 35 U.S.C. 154(b) by 0 days.

(21) Appl. No.: 09/595,297

(22) Filed: Jun. 15, 2000

Related U.S. Application Data

(60) Provisional application No. 60/140,504, filed on Jun. 22, 1999.

(51) Int. Cl.$^7$ .................................................. E04H 15/00
(52) U.S. Cl. ............................................................ 24/460
(58) Field of Search ........................ 24/459–462; 135/87, 135/90, 115, 119; 296/98, 100; 52/3, 745.06, 741.1

(56) References Cited

U.S. PATENT DOCUMENTS

| | | | |
|---|---|---|---|
| 4,657,062 | * | 4/1987 | Tuerk . |
| 4,686,748 | * | 8/1987 | Kaivanto . |
| 4,688,304 | * | 8/1987 | Marcott . |
| 5,074,014 | * | 12/1991 | Freeman . |
| 5,168,605 | * | 12/1992 | Bartlett . |
| 5,209,442 | * | 5/1993 | Buck et al. . |
| 5,692,272 | * | 12/1997 | Woods . |

* cited by examiner

Primary Examiner—James R. Brittain  
(74) Attorney, Agent, or Firm—Brian D. Smith, P.C.

(57) ABSTRACT

A tie down device for sheet material such as tarpaulin and the like is disclosed. The device includes a bar and a sleeve. The sleeve has a slit extending from end to end thereof for receiving the bar as well as sheet material which extends around the bar and outwardly through the slit of the sleeve on opposite sides of the bar. In addition, a rope is secured to the bar which extends through the slit when the bar is received in the sleeve. The rope enables the device to be placed under tension so that the bar binds the sheet material extending around the bar against the sleeve. This binding action firmly secures the sheet material to the device and thereby prevents the sheet material from slipping out of the device between the bar and the sleeve. The device also includes means for preventing the bar from sliding out of the sleeve when the device is placed under tension. A tent pole having a tie down device attached at one end of the pole is also disclosed.

25 Claims, 5 Drawing Sheets

TIE DOWN DEVICE AND METHOD OF USE

CROSS REFERENCE TO RELATED APPLICATIONS

This application is a nonprovisional application claiming the benefit under 35 USC 119(e) of U.S. provisional application Ser. No. 60/140,504, filed on Jun. 22, 1999.

FIELD AND OBJECTS OF THE INVENTION

The invention relates to devices for securing or tying down a tarpaulin (hereinafter "tarp or tarp material") and other flexible or fabric sheet materials without using conventional grommets or piercing the material in any way. The invention has as its primary object the provision of a device of this character which attaches to the tarp in a way that minimizes the possibility of the device coming loose or otherwise disengaging itself from the tarp or other sheet material.

With these and other objects in view, this invention consists in certain novel features of construction, combination and arrangement of parts to be hereinafter more fully described and claimed.

SUMMARY OF THE INVENTION

The present invention is directed to a tie down device for sheet material such as tarpaulin and the like. In its broadest sense, the tie down device includes a bar (also referred to herein as an inner tube) and a sleeve having a slit extending from end to end thereof. The sleeve's ends are open for receiving the bar and a sheet of material positioned around the bar. The sleeve's slit enables sheet material positioned around the bar to project outwardly through the slit on opposite sides of the bar. The bar's cross section is sized and configured so that both the bar and the sheet material can be received in the sleeve. In addition, rope means such as rope, cord or cable is secured to the bar. The rope means extends through the slit when the bar is received in the sleeve and it enables the device to be placed under tension so that the bar binds the sheet material positioned around the bar against the sleeve. This binding action firmly secures the sheet material to the device and thereby prevents the sheet material from slipping out of the device between the bar and the sleeve.

In addition to the foregoing, the tie down device of the present invention preferably includes means for preventing the bar from sliding out through the ends of the sleeve when the device is placed under tension. One such preferred means includes a notch defined by the sleeve which opens into the slit of the sleeve. The notch prevents the bar from sliding out of the sleeve by receiving the rope means attached to the bar which effectively locks the bar to the sleeve.

Another preferred means for preventing the bar from sliding out of said sleeve includes a raised portion defined by the bar which is sized and configured for engaging receipt with the sleeve's slit and ends when the sheet material is located therebetween, i.e. between the raised portion and the sleeve's slit and ends. This embodiment puts very little stress on any one area of the tarp and thus is suitable for use on thin or brittle sheet material having a tendency to tear.

In addition to the foregoing, the present invention also provides a unique tent or awning pole having a tie down device attached at one end of the pole for securing the device to the sheet material. When placed in a generally upright position the pole can be used to support any area of the sheet material without falling over as long as tension is maintained on its tie down device as more fully described herein.

The present invention also has an embodiment which does not require a rope means for placing the device under tension. The embodiment is employed in situations where the sheet material is (or will be) placed under tension by some other means. This embodiment includes an elongated bar having a raised portion and a sleeve having a slit extending from end to end thereof. The ends of the sleeve are open for receiving the bar and a sheet of material positioned around the bar. The slit enables the sheet material to project outwardly therethrough on opposite sides of the bar. In addition, the bar has a cross section which is sized and configured so that both the bar and the sheet material are capable of being received in the sleeve. The bar and raised portion serve to bind the sheet material positioned around the bar against the sleeve when the sheet material is tensioned. In addition, the bar's raised portion is sized and configured to fit within the slit of the sleeve to prevent the bar from rotating within the sleeve when the sheet material is tensioned.

BRIEF DESCRIPTION OF THE DRAWINGS

The invention will be more readily understood by reference to the accompanying drawings wherein like reference numerals indicate like elements, and wherein reference numerals sharing the same last two digits identify similar corresponding elements throughout the various disclosed embodiments, and in which.

DETAILED DESCRIPTION OF THE PREFERRED EMBODIMENTS

Figure 1:
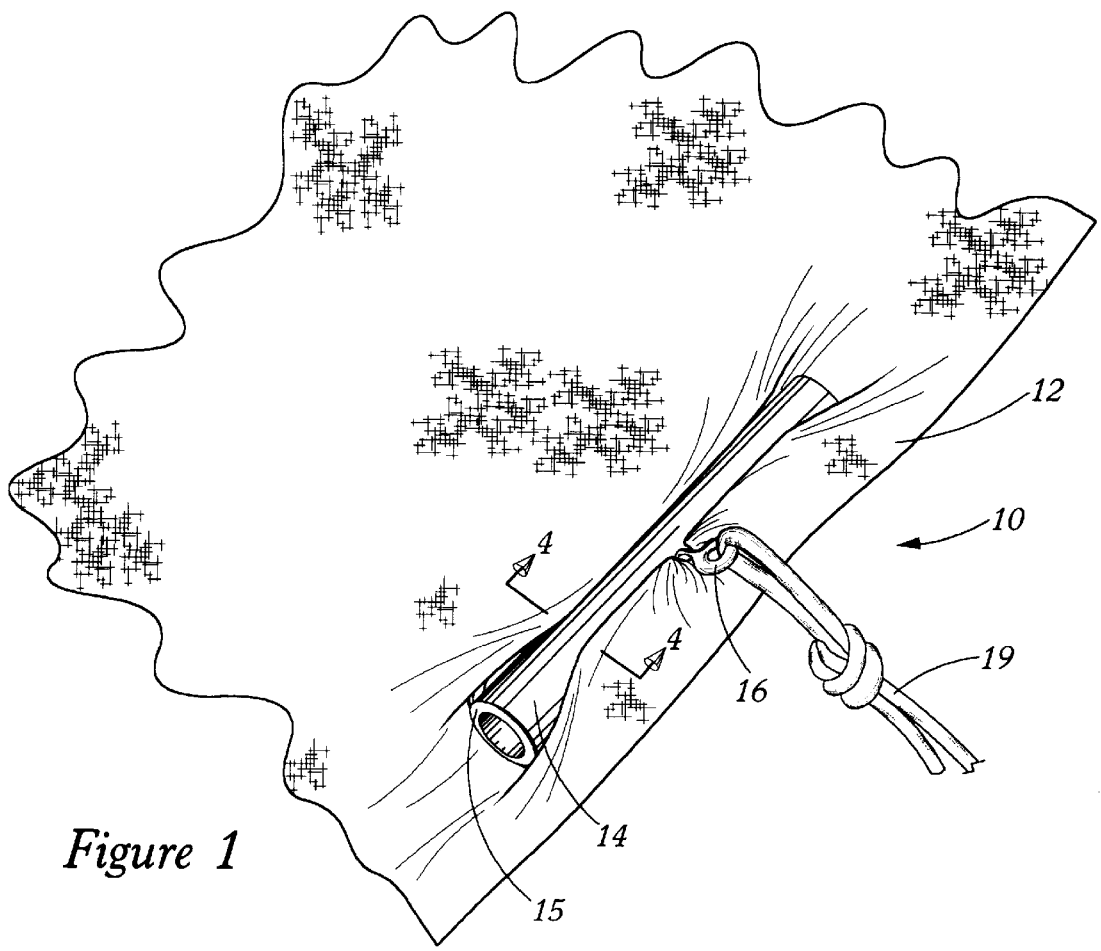
FIG. 1 is a perspective view showing a first tie down device of the present invention secured to a tarpaulin.
Figure 2:
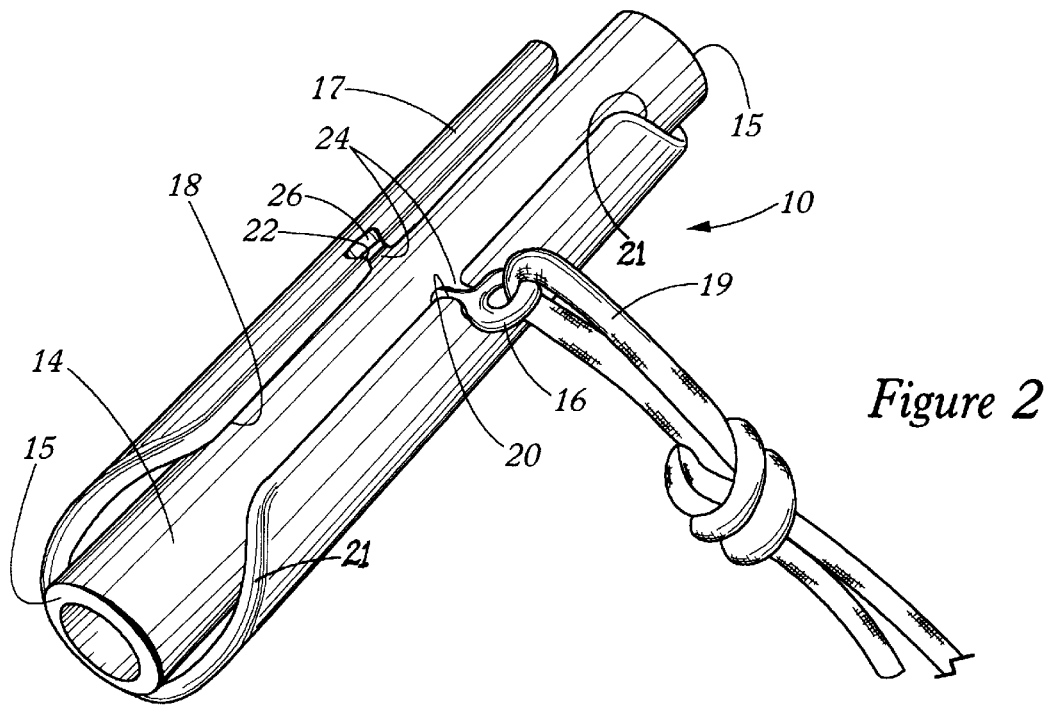
FIG. 2 is a perspective view showing the tie down device of FIG. 1 in isolation.
Figure 3:
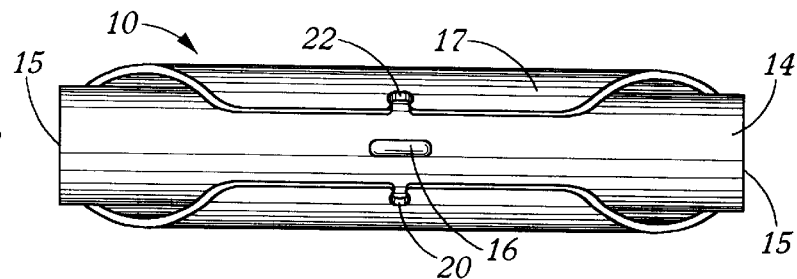
FIG. 3 is a top plain view of the tie down device of FIG. 1 also shown in isolation.
Figure 4:
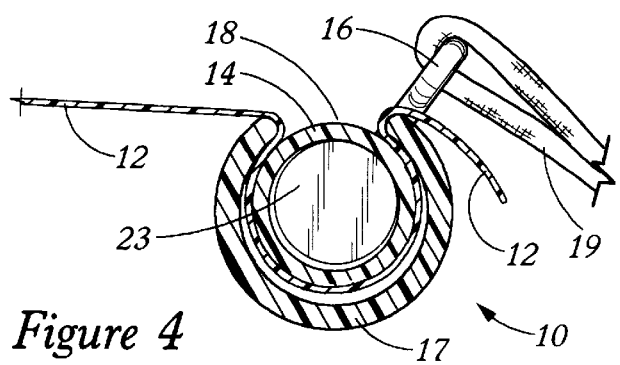
FIG. 4 is a cross-sectional view taken along lines 4—4 of FIG. 1.

FIGS. 1 through 4 illustrate a tie down device 10 of the present invention which as shown in FIG. 1 is attached to a conventional tarpaulin or tarp 12. Tie down device 10 generally consists of an inner cylindrical tube or bar 14 having somewhat rounded ends 15 and an eye bolt 16 secured thereto and positioned intermediate the ends 15. FIG. 4 illustrates that eye bolt 16 is secured to tube 14 by threading its threaded end (not shown) into a cylindrically shaped block 23 which is received in the hollow portion (not numbered) of tube 14. As also shown in FIG. 4, inner tube 14 is received in a split sleeve 17 having a main slit 18 which extends the length of the sleeve from its open end 21 to its opposite open end 21. As will be appreciated, tube 14 is actually loosely received in sleeve 17 to accommodate the tarp which is positioned between these members when the device is attached to the tarp. As such, tube 14 has a cross section which is sized and configured, i.e. its outside diameter is sized, so that both the tube and the tarp are capable of being received in the sleeve.

As shown in FIGS. 2 and 3, split sleeve 17 also defines a pair of opposed notches 20 and 22 which open to main slit 18. Each notch 20, 22 has an narrow entry or mouth portion 24 and a wider base portion 26 for receiving eye bolt 16. Mouth portion 24 is narrower than the base portion so that the eye bolt 16 cannot easily back out of the notch when it is received in the notch. As will be appreciated, the notch with eyebolt inserted therein also prevents the inner tube from sliding out of the sleeve.

To attach the tie down device 10 to the tarp, the tarp is placed or partially wrapped about the inner tube 14 and then inserted into sleeve 17 through an open end 21 thereof with the tarp projecting out through the slit of the sleeve on both sides of the eye bolt as shown in FIG. 1. The eye bolt 16 is then snapped or inserted into one of the notches 20, 22 as also shown in FIG. 1 to attach the device the device to the tarp. The tarp with the device attached thereto can then be moved around as desired without having to worry about the device coming loose or disengaging from the tarp.

After positioning the tarp and attached device as desired, e.g. over an object to be covered by the tarp, the tarp is tied down by tying rope 19 attached to eye bolt 16 to a fixed object such as a stake (not shown) which has been driven into the ground. Rope 19 is tied so that tension is placed on the rope. This tension causes the inner tube 14 to bind the tarp against the sleeve as shown in FIG. 4 which firmly secures the device to the tarp, i.e. so that the tarp cannot slip or slide out of the device between the inner tube 14 and sleeve 17. As will be appreciated, to maintain such tension on the device the other end of the tarp must be fixedly secured or anchored to something. Such anchoring can be provided by using another or perhaps several devices 10 of the present invention which may be placed anywhere on the tarp (not just along the edges of the tarp as is the case with conventional grommets) as long as they are in a position where they can be placed under tension when their ropes 19 are tied down.

Finally, a close inspection of the drawings will reveal that notch 22 is larger than notch 20, i.e. its mouth and base portions 22, 26 are larger than those of notch 20. This enables one to use the device on tarps of different thicknesses with the larger notch 22 being used on thicker tarps and the smaller notch being used on thinner tarps.

Figure 5:
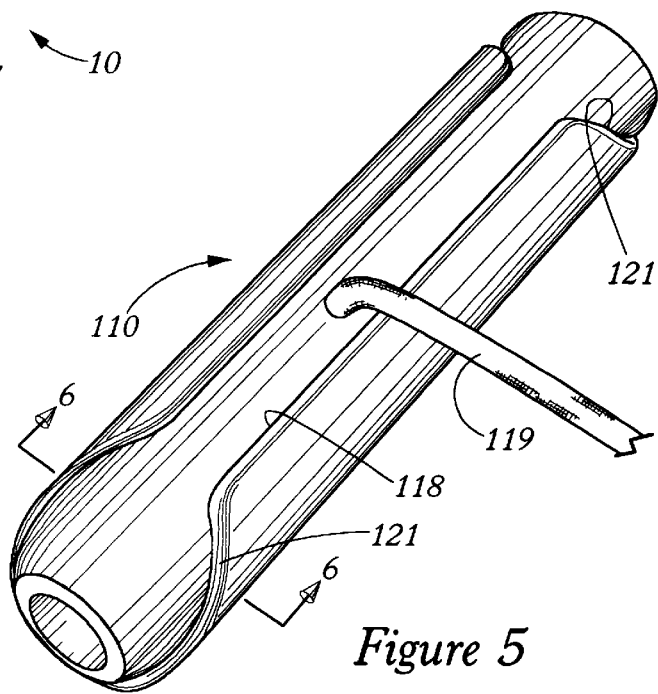
FIG. 5 is a perspective view showing a second tie down device of the present invention in isolation.
Figure 6:
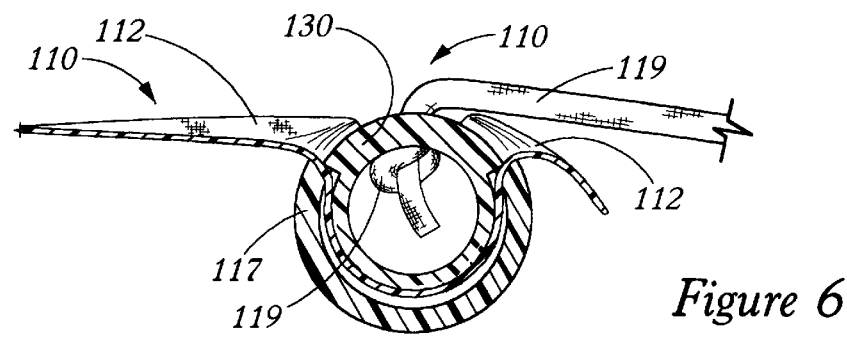
FIG. 6 is a cross-sectional view taken along lines 6—6 of FIG. 5 which additionally shows the tarpaulin secured to the device.
Figure 7:
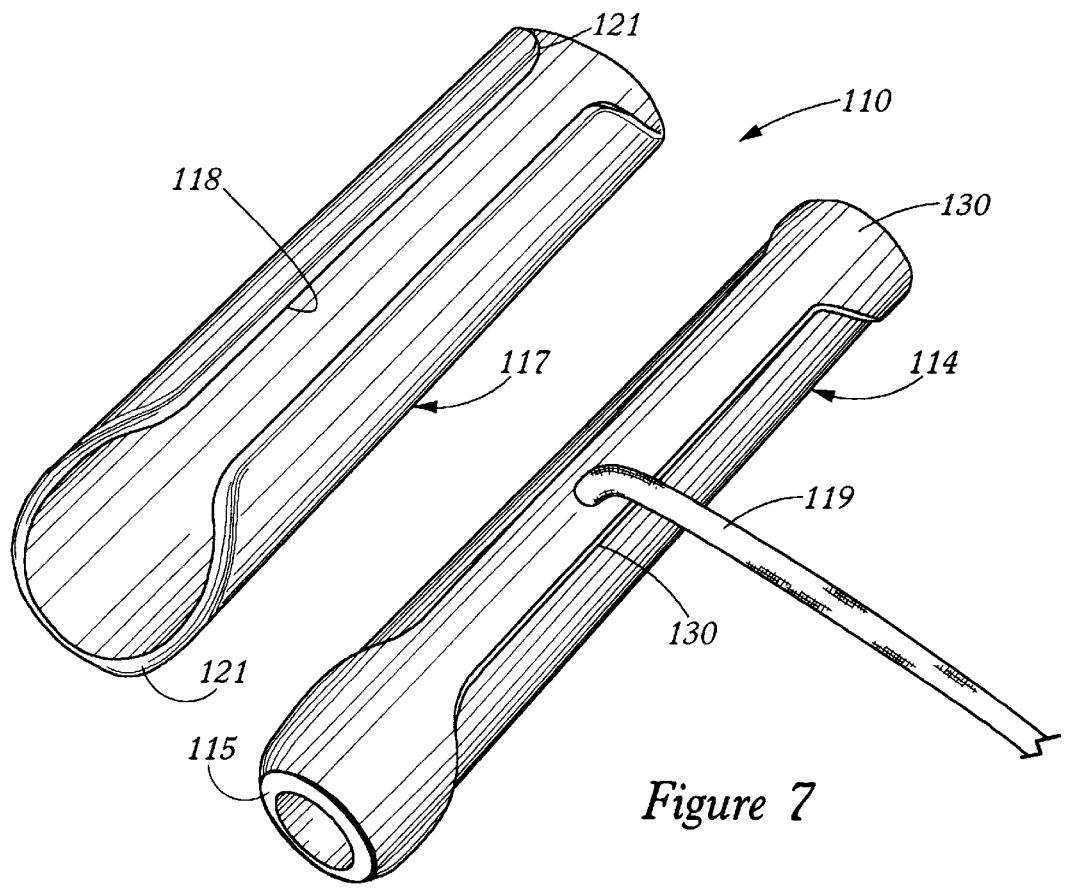
FIG. 7 is a perspective view showing the inner tube and sleeve components of the tie down device of FIG. 5.

FIGS. 5 through 7 illustrate another tie down device 110 of the present invention which is similar to device 10 except that instead of being provided with notches 20, 22 and eye bolt 16, inner tube or bar 114 is provided with a complementary raised portion 130 which is sized and configured for engaging receipt with the main slit 118 and the open ends 121 of the split sleeve when the sheet material is located therebetween, i.e. between the raised portion and the main slit and ends of the split sleeve. As will be appreciated, when device 110 is placed under tension as discussed above by tying rope 119 off and securing or anchoring the other end of the tarp 112, raised portion 130 and thus inner tube 114 will be engaged with the sleeve, thereby preventing the inner tube from sliding out of split sleeve 117, i.e. as long as raised portion 130 is positioned about ends 121 when the device is placed under tension. This embodiment puts very little stress on any one area of the tarp and thus is less likely to tear the tarp than device 10 which does put some stress on the portion of the tarp which is located between eye bolt and the notch.

Figure 8:
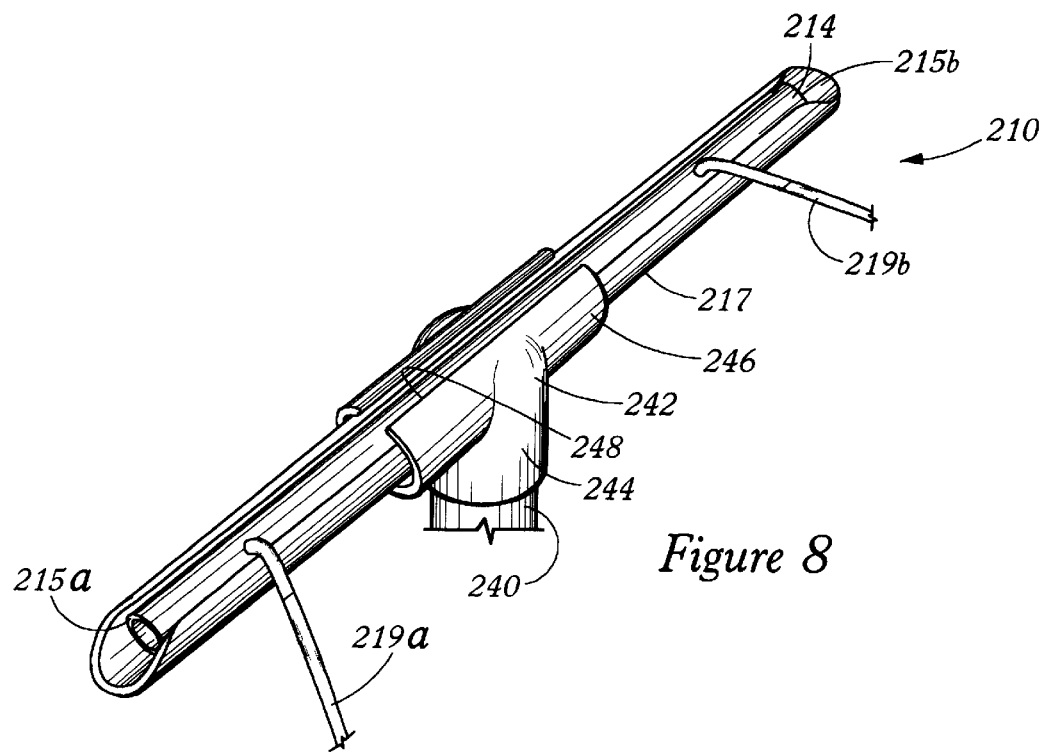
FIG. 8 is a perspective view showing a third tie down device of the present invention mounted on a pole.

FIG. 8 illustrates yet another tie down device 210 which prevents sideways motion of the inner tube or bar 214 out of the split sleeve 217 by using a pair of ropes 219a, b which are tied off at angles with respect to each other so that the ropes pull on the inner tube 214 from opposite directions. This causes the longitudinal forces acting along the axis of the inner tube to cancel each other which thereby prevents the inner tube from sliding out of the split sleeve. To facilitate such force cancellation, ropes 219a, b should be attached to tube 214 at opposite ends of the tube, i.e. rope 219a should be attached near end 215a of the tube with rope 219b attached near end 215b as shown.

It has been found that under severe stress or tension such as might be found under extremely windy conditions sleeve 217 can actually cut ropes 219a, b if the ropes are ordinary cloth ropes. Therefore, under such conditions it is advisable to use high strength rope material for ropes 219 or in the alternative bar 214 could be provided with a raised rib (similar to rib 445 of FIGS. 11–12) which would fit in the main slit of the sleeve and which would prevent the bar from rolling or rotating within the sleeve which as indicated could cut ropes 219.

FIG. 8 also illustrates that device 210 is mounted on a pole 240 with a split tee 242. As shown, end 244 of tee 242 receives the upper end of pole 240 while the split cross portion 246 of the tee receives sleeve 217 of device 210. The cross portion 246 of the tee is split, i.e. provided with a slot 248, to facilitate insertion of the split sleeve 217 into the cross portion which preferably snugly fits within the cross portion. By mounting the device 210 on pole 240, those skilled in the art will appreciate that the combination can be used as a tent pole or awning pole to support a tarp along its edge as shown or anywhere in the center of the tarp. If used to support a more central area of the tarp, ropes 219 might not be needed since tension on the device 210 would in all likelihood be provided by whatever means is used to tension or tie the tarp down along its edges.

Figure 9:
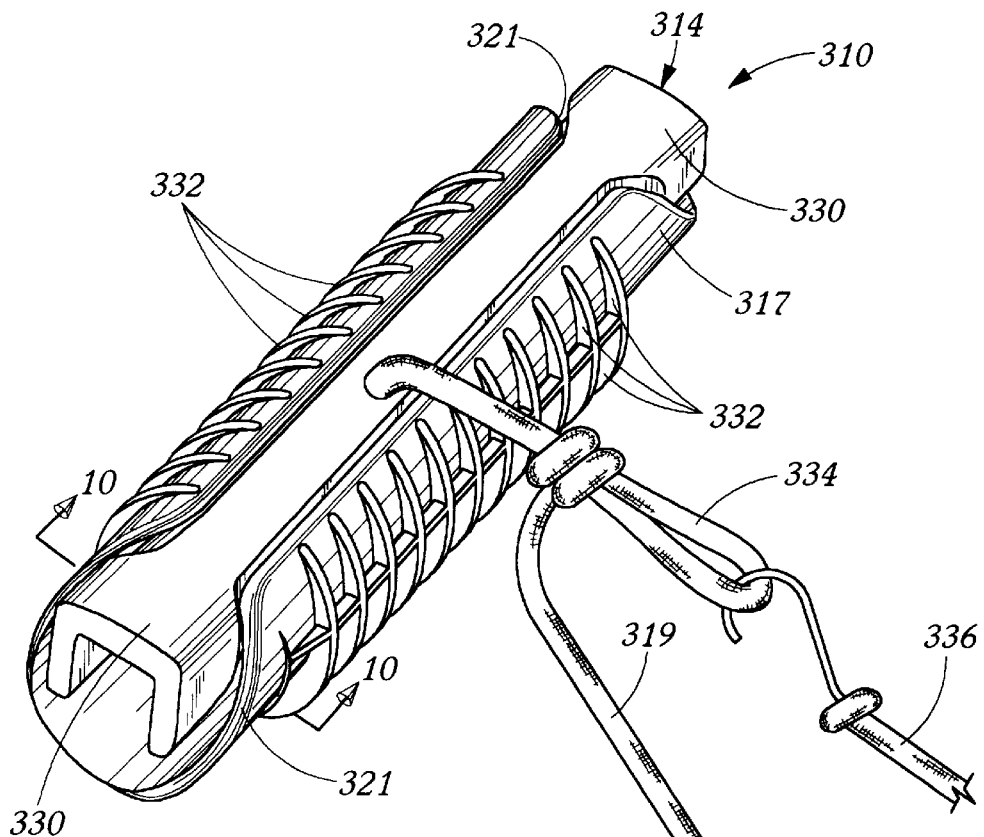
FIG. 9 is a perspective view showing a third tie down device of the present invention in isolation.
Figure 10:
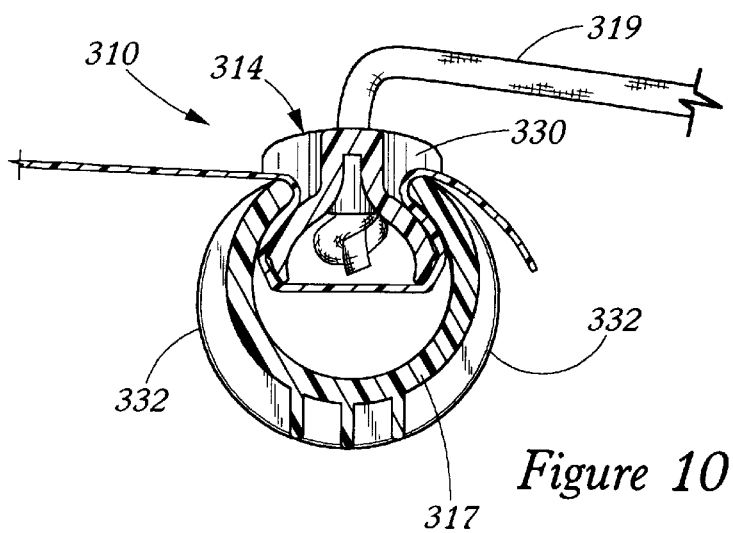
FIG. 10 is a cross-sectional view taken along lines 10—10 of FIG. 9 which additionally shows the tarpaulin secured to the device.

FIGS. 9 and 10 illustrate another tie down device 310 of the present invention which structurally and functionally is very similar to device 110. As will be appreciated, however, the split sleeve 317 of device 310 is additionally provided with strengthening ribs 332 which insure that the sleeve will not flex open or otherwise break when the device is under tension, i.e in use. If the device is not provided with these ribs it has been found that the sleeve has a tendency to flex open in the sense that the slit, e.g. slit 18, becomes wider when the device is under tension.

FIG. 9 also illustrates that a loop 334 can be tied into rope 319 of device 310 which enables the rope to be attached to an elastic cord 336 of the type sold under the trademark "Bungee Cord". Such an elastic cord helps to insure that tension is maintained on the device at all times while it is being used. For example, if the device is being used in gusty wind conditions it could lose tension when subjected to a strong wind gust. However, by using an elastic cord of the Bungee type tension can generally be maintained on the device even under such wind conditions.

Figure 11:
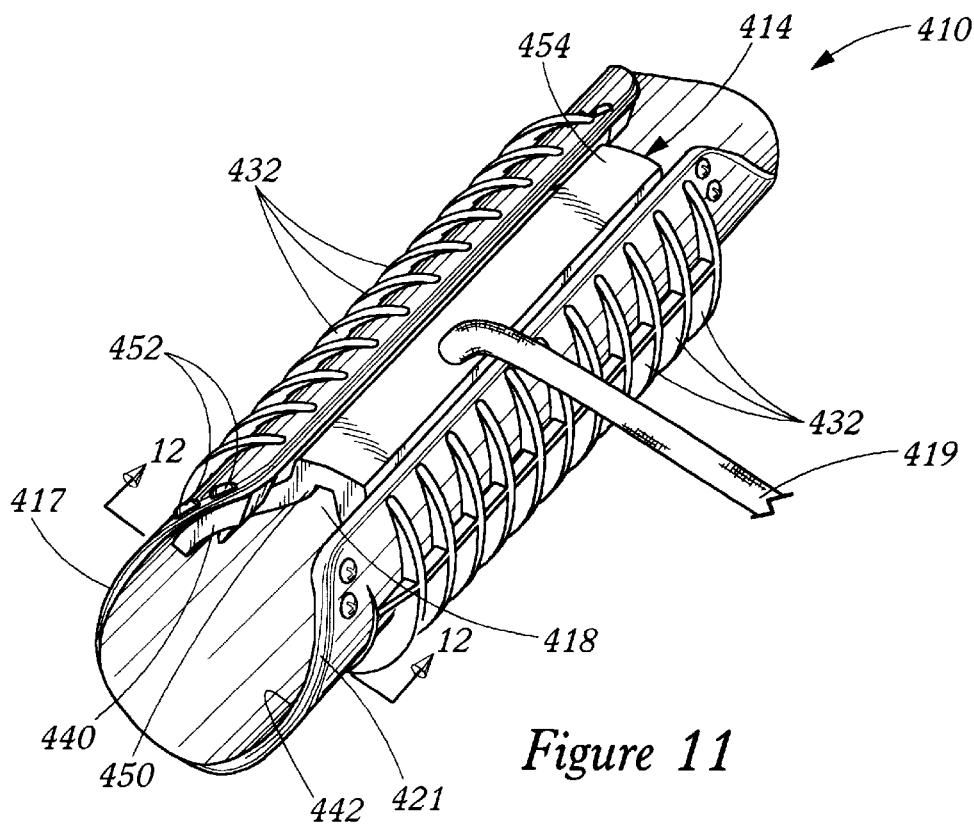
FIG. 11 is a perspective view showing a fourth tie down device of the present invention in isolation.
Figure 12:
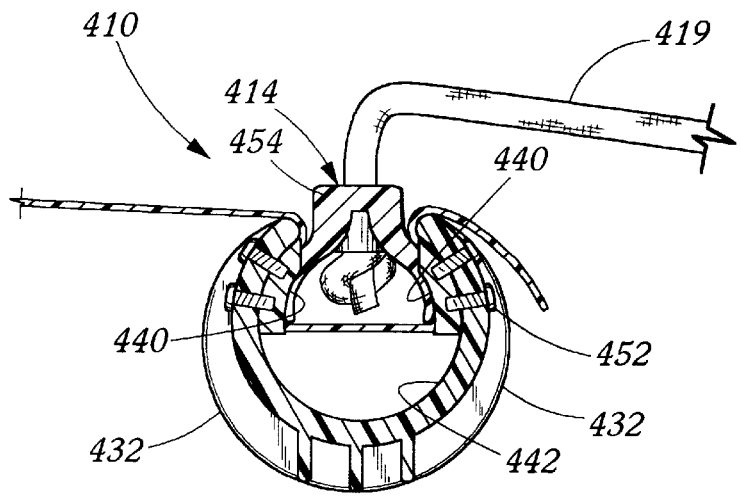
FIG. 12 is a cross-sectional view taken along lines 12—12 of FIG. 11 which additionally shows the tarpaulin secured to the device.

FIGS. 11 and 12 illustrate another device 410 of the present invention which is similar to device 310 in that it also is provided with strengthening ribs 432. However, a close inspection of device 410 will reveal that it differs from device 310 in that its bar 414 is not provided with a raised portion 330 which impacts up against the ends 321 of the split sleeve 317 of device 310 to prevent the bar from sliding out of the sleeve. Instead, sleeve 417 of device 410 is provided with nibs 440 on its inside surface 442 adjacent the sleeve's ends 421 and slit 418. These nibs, as will be appreciated, serve as stops to catch the ends 450 of bar 414 and thereby prevent the bar from sliding out of the sleeve when the bar is subjected to forces tending to cause such sliding movement. As shown in FIGS. 11 and 12, nibs 440 are attached to the inside surface 442 of the sleeve by rivets 452. While rivets are illustrated, the nibs could be and preferably would be molded into the sleeve. In addition, while bar 414 is not provided with a raised portion 330 to the prevent the bar from sliding out of the sleeve, bar 414 is nonetheless provided with a raised section or rib 454 which serves to prevent the bar from rolling or rotating within the sleeve.

The invention has been described in detail with reference to particular embodiments thereof, but it will be understood that various other modifications can be effected within the spirit and scope of this invention. For example, the bar, sleeve, raised portion, notches and other components of the various described embodiments could be provided in many shapes and configurations as long as they cooperate to provide the required engagement between the bar and sleeve as described above.

I claim:

1. A tie down device for sheet material such as a tarp and the like, said tie down device comprising:
   a bar;
   a sleeve having a slit extending from end to end thereof, said ends being open for receiving said bar and a sheet of material positioned around said bar, said slit enabling the sheet material to project outwardly through said slit on opposite sides of said bar, said bar having a cross section which is sized and configured so that both said bar and the sheet material are capable of being received in said sleeve;
   rope means secured to said bar and extending through the slit for enabling the device to be placed under tension so that said bar binds the sheet material positioned around said bar against said sleeve to firmly secure the sheet material to the device, thereby preventing the sheet material from slipping out of the device between the bar and the sleeve; and
   means for preventing said bar from sliding out through said ends of said sleeve when said device is placed under tension.

2. A tie down device as claimed in claim 1 wherein said means for preventing said bar from sliding out of said sleeve includes a notch defined by said sleeve which opens into said main slit of said sleeve for receiving said rope means, said notch preventing said bar from sliding out of said sleeve when said rope means is received in said notch.

3. A tie down device as claimed in claim 2 wherein said rope means includes an eye bolt attached to said bar for being received in said notch to prevent said bar from sliding out of said sleeve.

4. A tie down device as claimed in claim 1 wherein said rope means includes a member selected from the group consisting of rope, cord and cable.

5. A tie down device as claimed in claim 4 wherein said cord includes elastic cord.

6. A tie down device as claimed in claim 1 wherein said means for preventing said bar from sliding out of said sleeve includes a raised portion defined by said bar which is sized and configured for engaging receipt with said sleeve.

7. A tie down device as claimed in claim 1 wherein said means for preventing said bar from sliding out of said sleeve includes a raised portion defined by said bar which is sized and configured for engaging receipt with said main slit and said ends of said sleeve to prevent said bar from sliding out of said sleeve.

8. A tie down device as claimed in claim 1 wherein said means for preventing said bar from sliding out of said sleeve includes a raised portion defined by said bar which is sized and configured for engaging receipt with said main slit and said ends of said sleeve when the sheet material is located between said raised portion of said bar and said main slit and said ends of said sleeve.

9. A tie down device as claimed in claim 1 wherein said means for preventing said bar from sliding out of said sleeve includes a pair of said rope means attached to said bar at opposite ends thereof, said pair of rope means preventing said bar from sliding out of said sleeve when they are tied off at angles with respect to each other so that they pull on said bar from opposite directions.

10. A tie down device as claimed in claim 1 further comprising a pole for attachment to said sleeve.

11. A tie down device as claimed in claim 10 wherein said pole has a tee mounted on an end thereof with a cross portion for receiving said sleeve to attach said pole to said sleeve.

12. A tie down device as claimed in claim 1 further comprising strengthening ribs on said sleeve.

13. A tie down device as claimed in claim 1 wherein said rope means includes elastic cord.

14. A tie down device as claimed in claim 1 wherein said means for preventing said bar from sliding out of said sleeve includes nibs provided on the inside surface of said sleeve adjacent said slit defined by said sleeve and said sleeve's ends, said nibs serving as stops to catch the ends of said bar to prevent the bar from sliding out of the sleeve.

15. A tie down device as claimed in claim 1 wherein said means for preventing said bar from sliding out of said sleeve further prevents said bar from rotating within said sleeve when said device is placed under tension.

16. A support device for sheet material such as a tarpaulin comprising:
   a bar;
   a sleeve having a slit extending from end to end thereof, said ends being open for receiving said bar and a sheet of material positioned around said bar, said slit enabling the sheet material to project outwardly through said slit on opposite sides of said bar, said bar having a cross section which is sized and configured so that both said bar and the sheet material are capable of being received in said sleeve;
   rope means secured to said bar and extending through the slit for enabling the device to be placed under tension so that said bar binds the sheet material positioned around said bar against said sleeve to firmly secure the sheet material to the device, thereby preventing the sheet material from slipping out of the device between the bar and the sleeve; and
   a pole for attachment to said sleeve.

17. A support device as claimed in claim 16 further comprising a tee for attaching said pole to said sleeve, said tee having an end for receiving an end of said pole, said tee also having a cross portion for receiving said sleeve.

18. A method of securely tying down sheet material such as a tarp over an object be covered by the sheet material, said method comprising the steps of:
   providing a tie down devices including:
   a bar;
   a sleeve having a slit extending from end to end thereof, said ends being open for receiving said bar and a sheet of material positioned around said bar, said slit enabling the sheet material to project outwardly through said slit on opposite sides of said bar, said bar having a cross section which is sized and configured so that both said bar and the sheet material are capable of being received in said sleeve;
   rope means secured to said bar and extending through the slit for enabling the device to be placed under tension so that said bar binds the sheet material positioned around said bar against said sleeve to firmly secure the sheet material to the device, thereby preventing the sheet material from slipping out of the device between the bar and the sleeve; and
   means for preventing said bar from sliding out of said sleeve when said device is placed under tension;
   covering an object with sheet material;
   tying down said sheet material at a first location on said sheet material;
   attaching said tie down device to the sheet material at a different location on said sheet material; and
   tying off said rope means of said tie down device to place said device under tension to securely tie down the sheet material covering the object.

19. A method as claimed in claim 18 wherein said sheet material at the first location is tied down with a said tie down device.

20. A method as claimed in claim 18 further comprising tying down said sheet material at a plurality of other locations with a plurality of said tie down devices.

21. A method as claimed in claim 18 wherein said rope means includes an elastic cord which is placed under tension when said device is tied off.

22. A device for attachment to sheet material such as a tarp and the like, said device comprising:
   an elongated bar having a raised portion and a sleeve having a slit extending from end to end thereof, said ends being open for receiving said bar and a sheet of material positioned around said bar, said slit enabling the sheet material to project outwardly therethrough on opposite sides of said bar, said bar having a cross section which is sized and configured so that both said bar and the sheet material are capable of being received in said sleeve, said raised portion of said bar being sized and configured to engage said sleeve so that said bar is prevented from rotating within said sleeve and sliding out of said sleeve when the sheet material is tensioned, said bar and raised portion also binding the sheet material positioned around said bar against said sleeve when the sheet material is tensioned.

23. A device as claimed in claim 22 wherein said raised portion is sized and configured for engaging receipt with said ends of said sleeve to prevent said bar from rotating within said sleeve and sliding out of said sleeve when the sheet material is tensioned.

24. A device as claimed in claim 22 wherein said raised portion is sized and configured for engaging receipt with said slit and said ends of said sleeve to prevent said bar from rotating within said sleeve and sliding out of said sleeve when the sheet material is tensioned.

25. A device for attachment to sheet material such as a tarp and the like, said device comprising:
   an elongated bar having a raised portion and a sleeve having a slit extending from end to end thereof, said ends being open for receiving said bar and a sheet of material positioned around said bar, said bar having a cross section which is sized and configured so that both said bar and the sheet material are capable of being received in said sleeve, said raised portion of said bar being sized and configured to engage said ends of said sleeve so that said bar is prevented from sliding out of said sleeve when the sheet material is tensioned.

* * * * *